July 31, 1928.

J. D. CONEY ET AL 1,679,204

WIREWORKING MACHINE

Filed Jan. 2, 1924

Inventors
James D. Coney,
Bernt Garllus,

By

Attorneys

July 31, 1928.
J. D. CONEY ET AL
1,679,204
WIREWORKING MACHINE
Filed Jan. 2, 1924
14 Sheets-Sheet 3
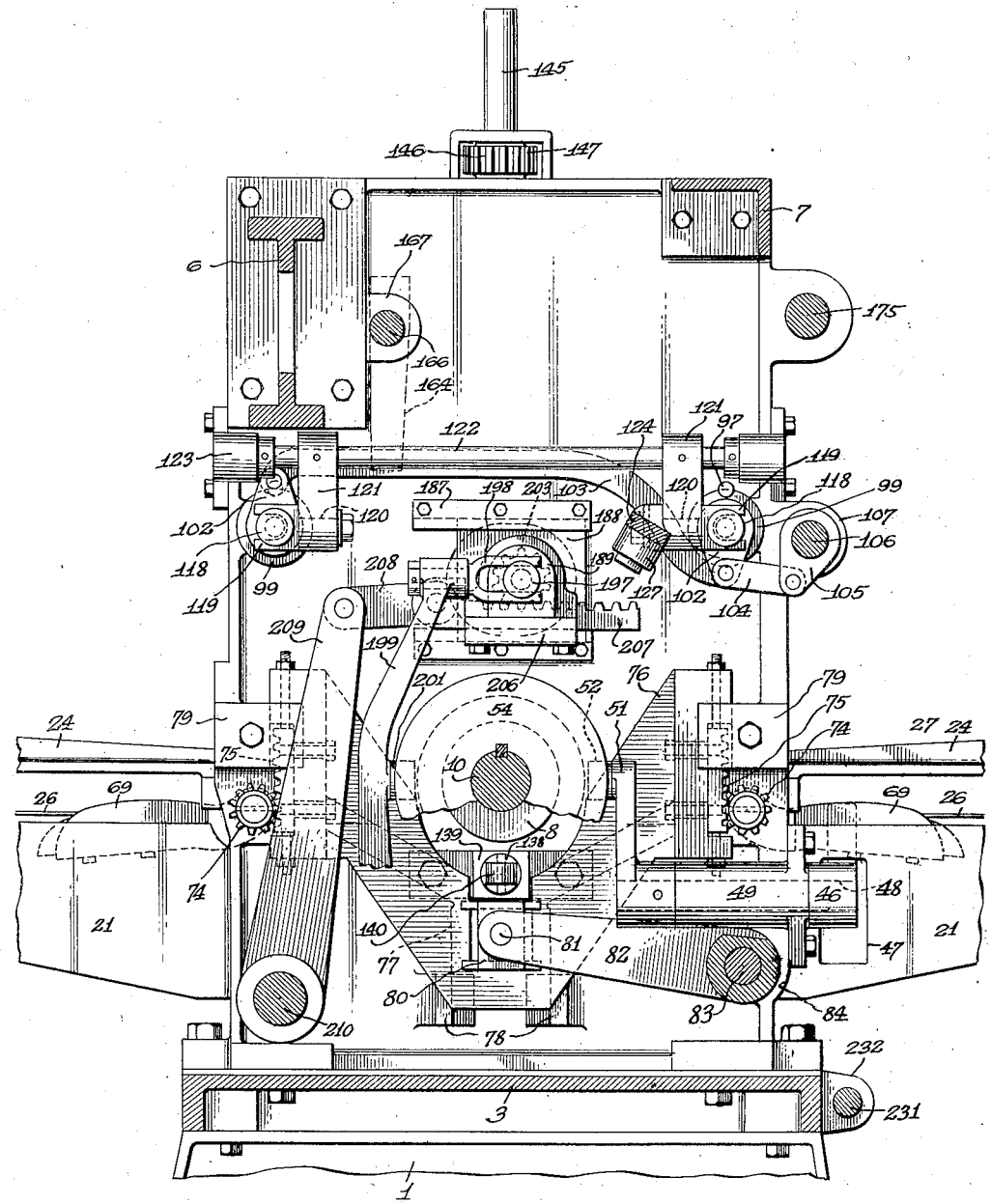
Fig.4.    Fig.3.
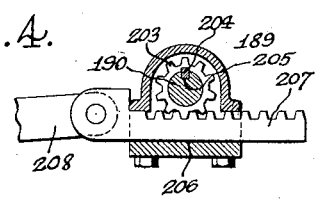
Inventors
James D. Coney,
Bernt Garllus,
By
Attorneys

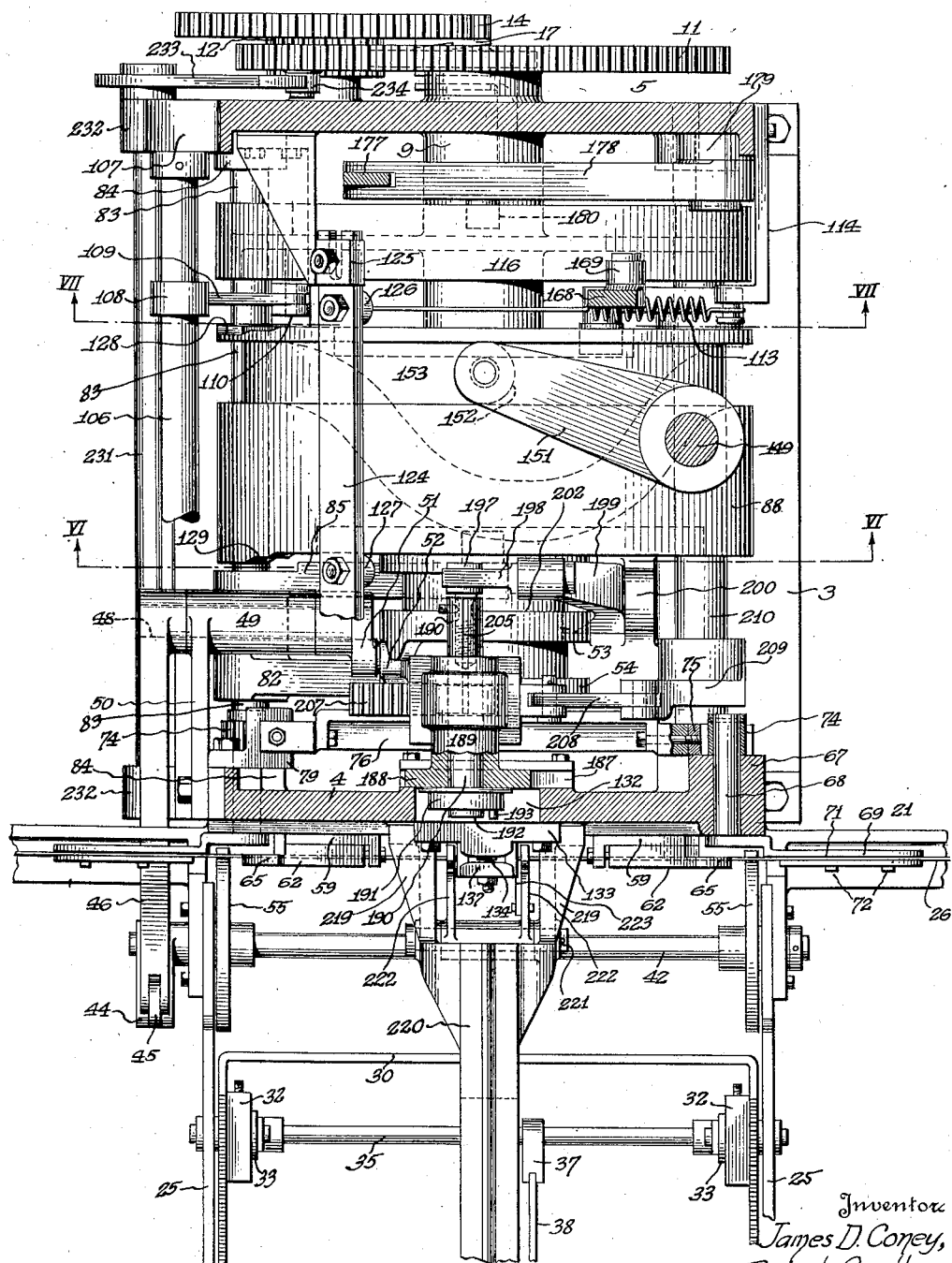

July 31, 1928.　　　　　　　　　　　　　　　1,679,204
J. D. CONEY ET AL
WIREWORKING MACHINE
Filed Jan. 2, 1924　　　　14 Sheets-Sheet 5

Inventors
James D. Coney,
Bernt Garllus,
By
Attorneys

July 31, 1928.
J. D. CONEY ET AL
1,679,204
WIREWORKING MACHINE
Filed Jan. 2, 1924
14 Sheets-Sheet 8
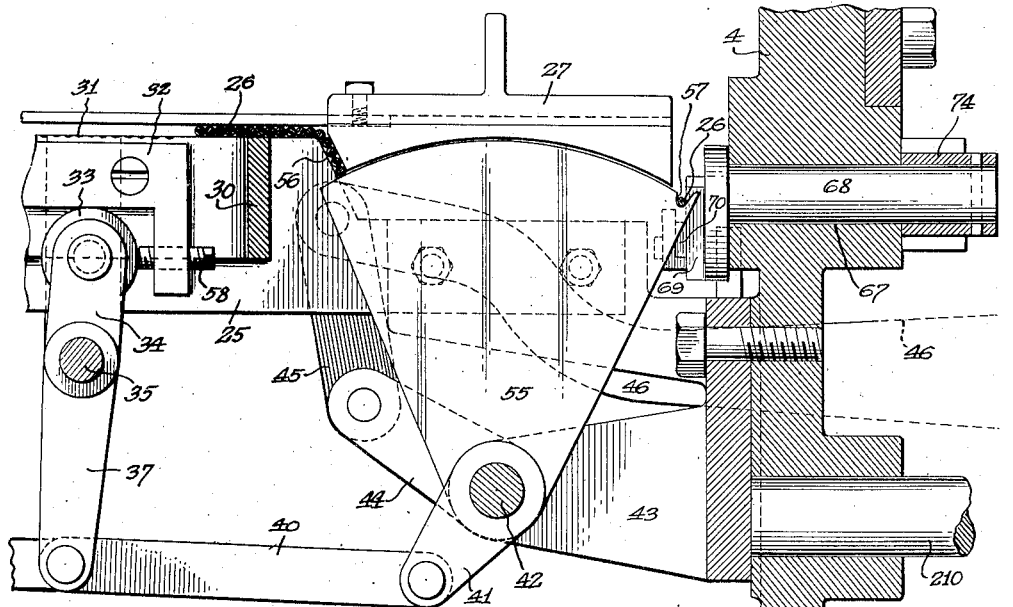
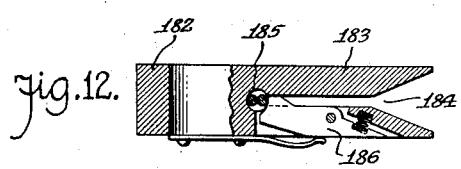
Fig.12.
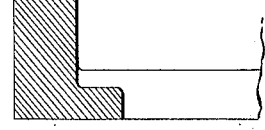
Fig.11.
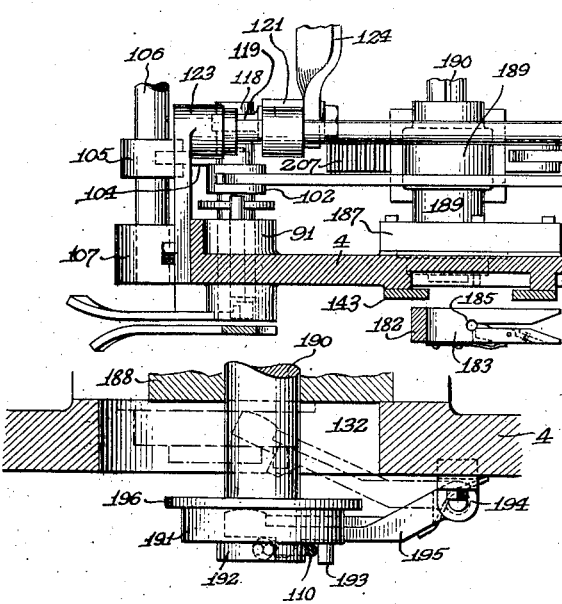
Fig.13.
Fig.14.
Inventors
James D. Coney,
Bernt Garllus
By
Attorneys July 31, 1928.
J. D. CONEY ET AL
WIREWORKING MACHINE
Filed Jan. 2, 1924
1,679,204
14 Sheets-Sheet 9
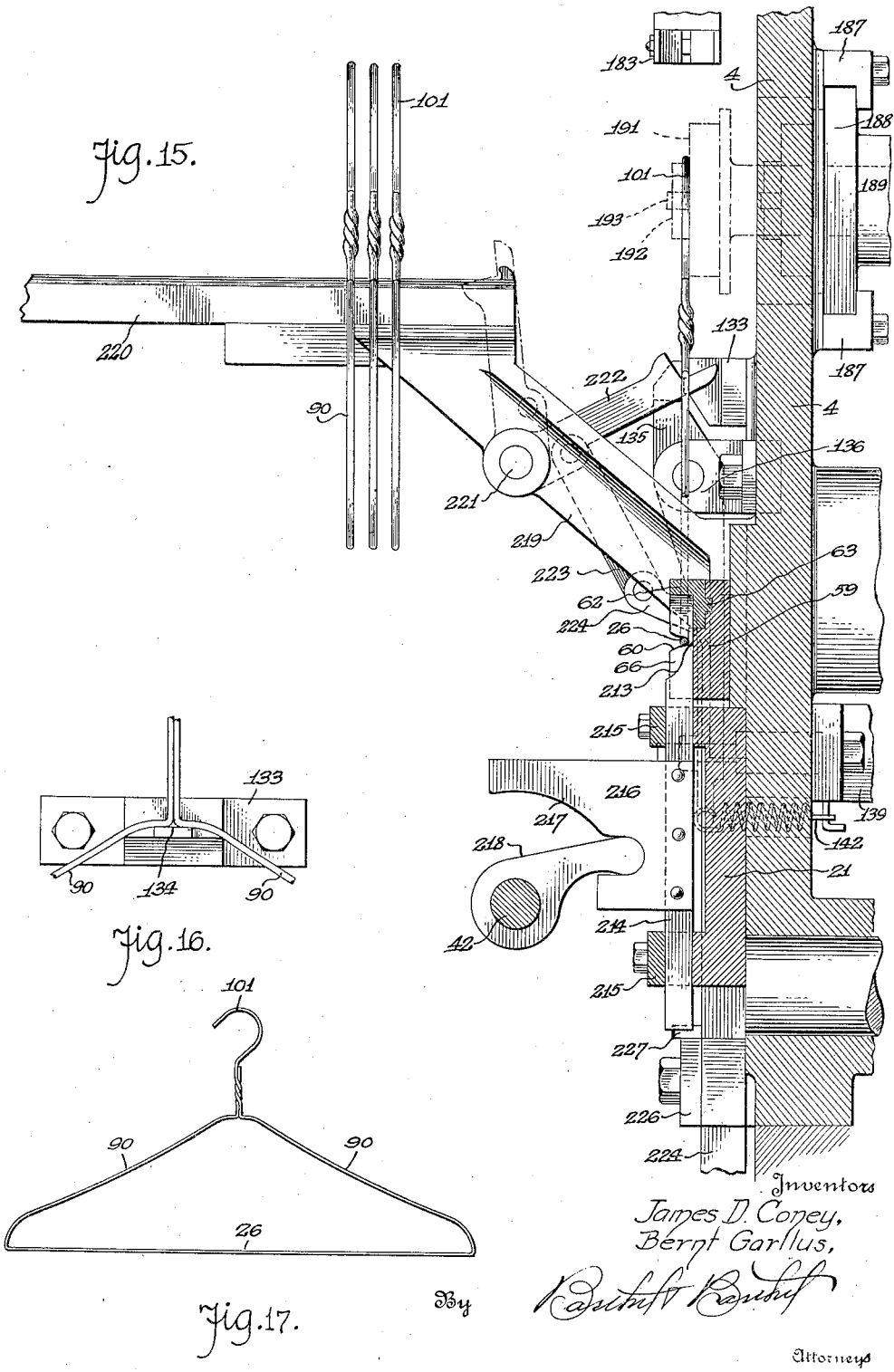

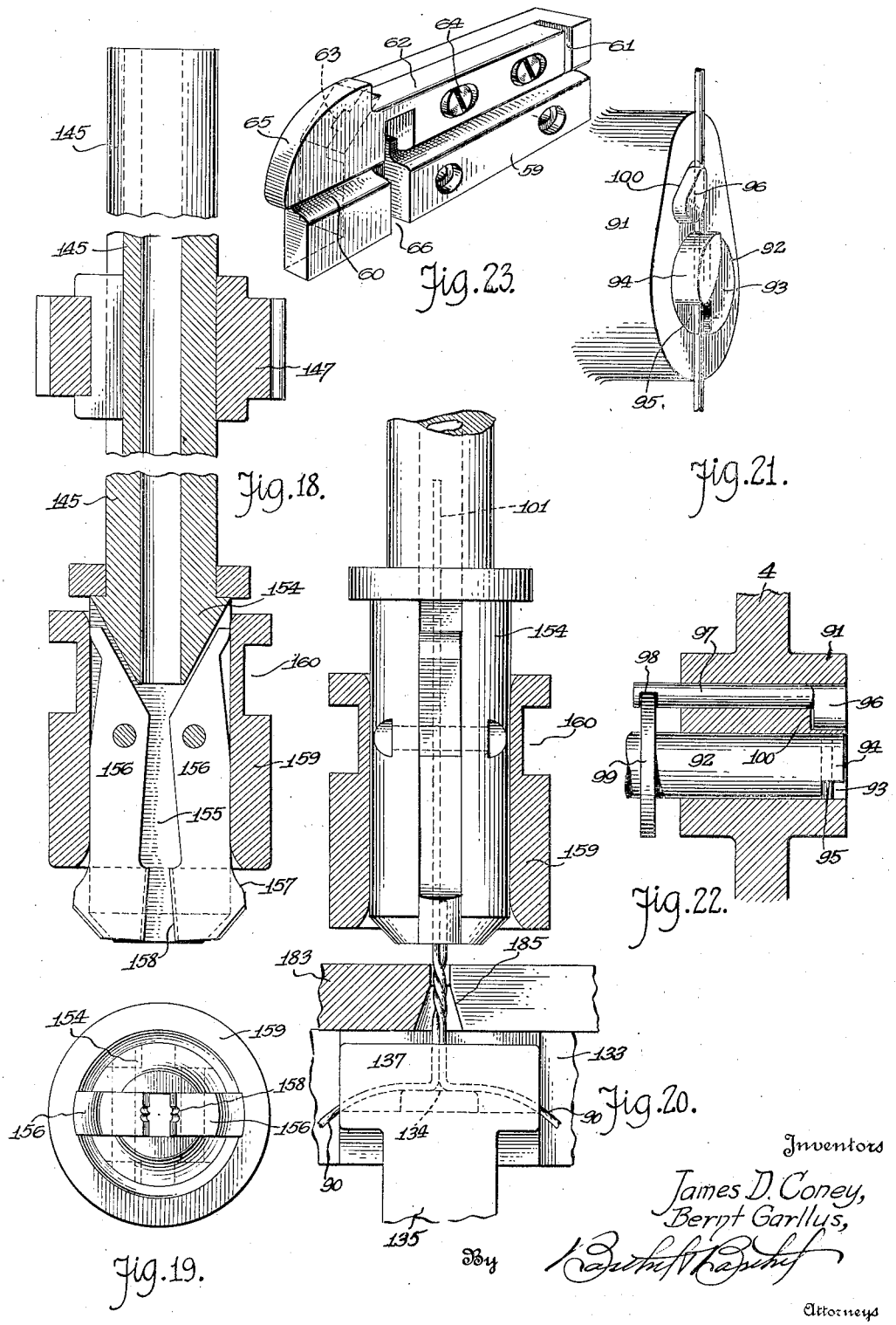

July 31, 1928.
J. D. CONEY ET AL
WIREWORKING MACHINE
Filed Jan. 2, 1924
1,679,204
14 Sheets-Sheet 11
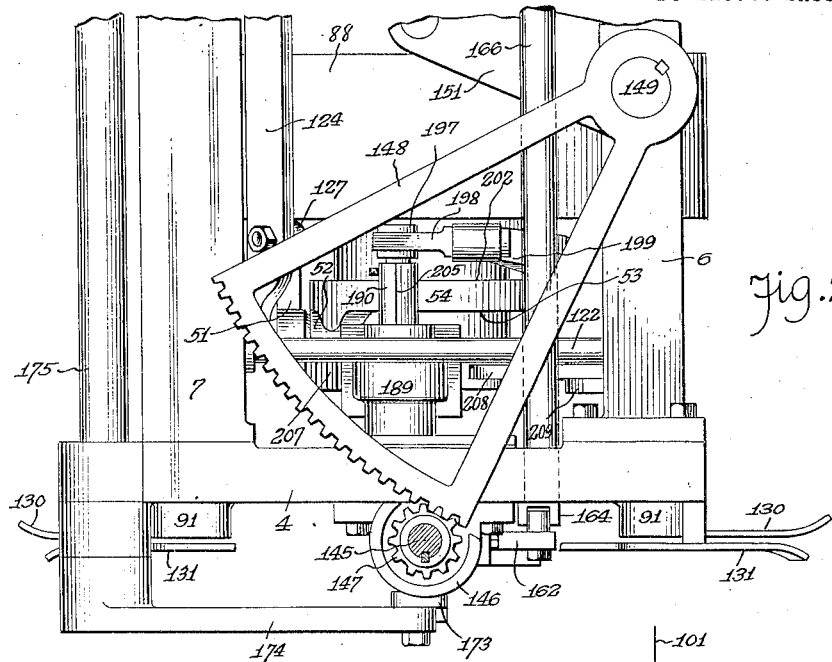
Fig.24.
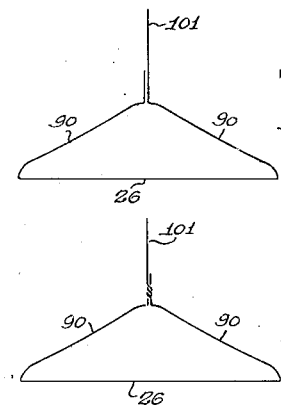
Fig.28.
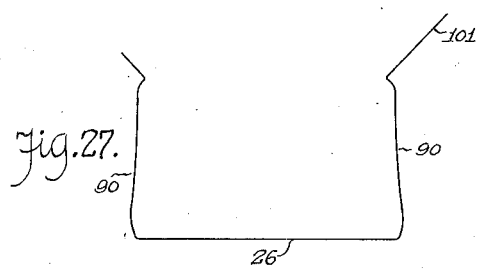
Fig.27.
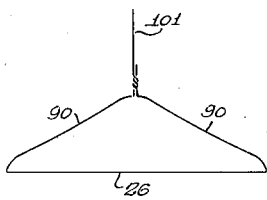
Fig.29.
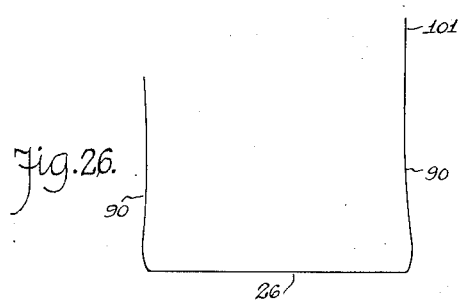
Fig.26.
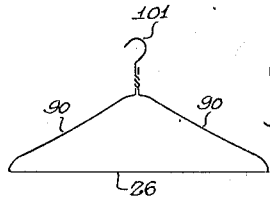
Fig.30.
Fig.25.
Inventors
James D. Coney,
Bernt Garllus,
By
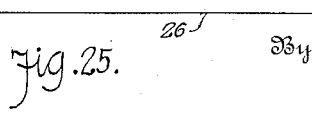
Attorneys July 31, 1928.  1,679,204
J. D. CONEY ET AL
WIREWORKING MACHINE
Filed Jan. 2, 1924  14 Sheets-Sheet 12
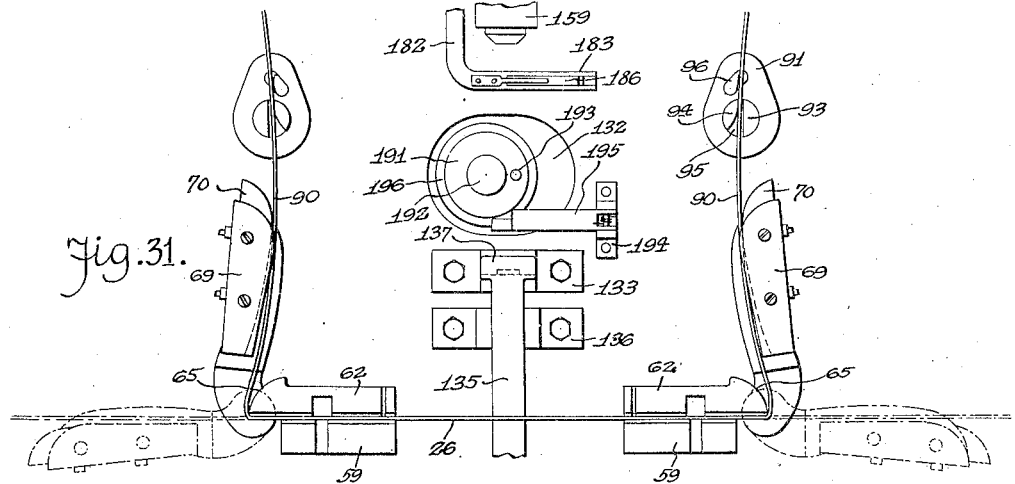
Fig. 31.
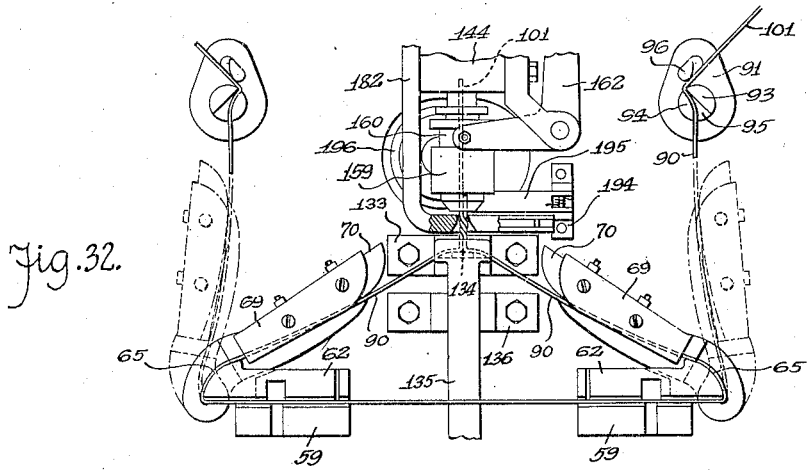
Fig. 32.
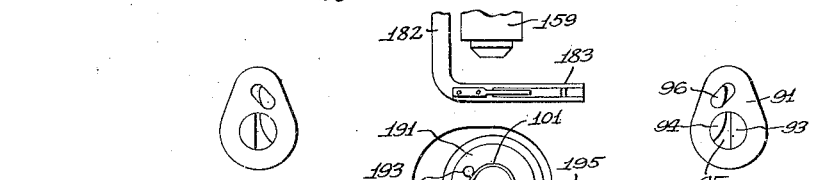
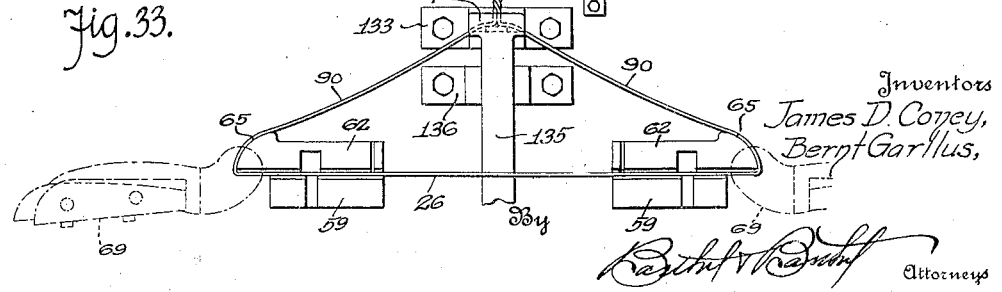
Fig. 33.
Inventors
James D. Coney,
Bernt Garllus,
By
Attorneys July 31, 1928.  1,679,204
J. D. CONEY ET AL
WIREWORKING MACHINE
Filed Jan. 2, 1924  14 Sheets-Sheet 13
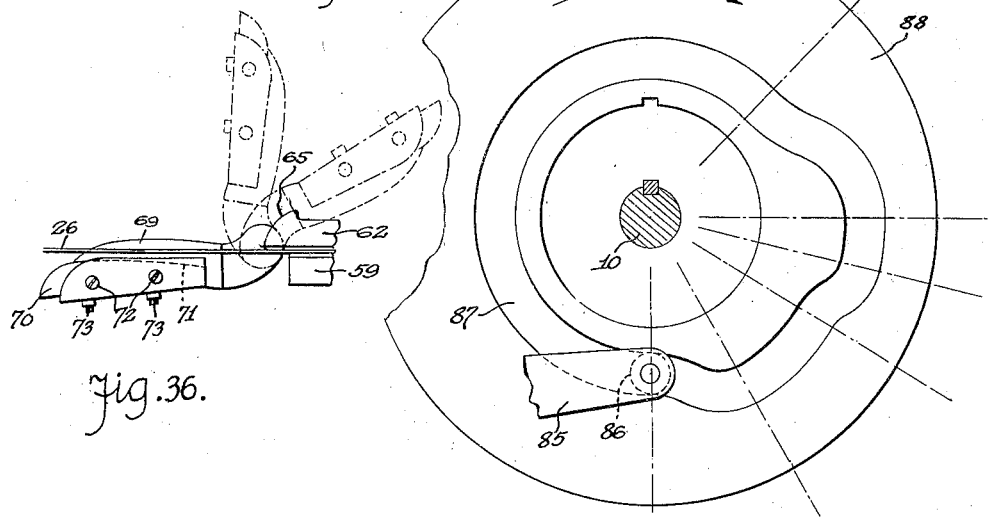
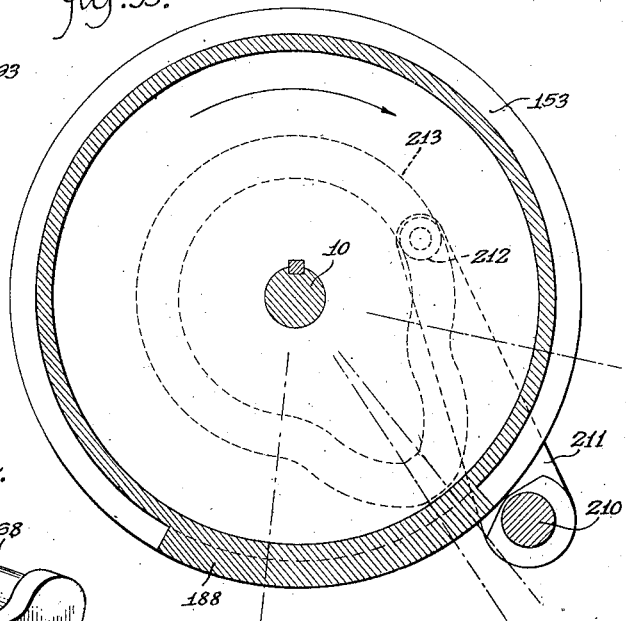
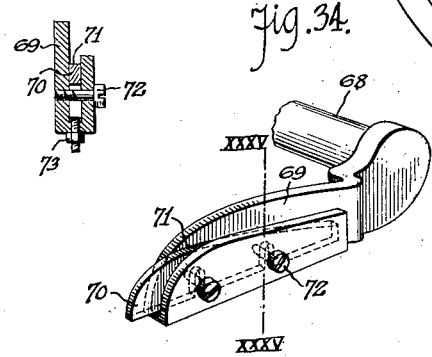
Inventors
James D. Coney,
Bernt Garllus,
By
Attorneys July 31, 1928.

J. D. CONEY ET AL 1,679,204

WIREWORKING MACHINE

Filed Jan. 2, 1924

Inventors.
James D. Coney,
Bernt Garllus,

By

Attorneys

Patented July 31, 1928.

1,679,204

UNITED STATES PATENT OFFICE.

JAMES D. CONEY AND BERNT GARLLUS, OF DETROIT, MICHIGAN, ASSIGNORS TO STAR SERVICE HANGER CO., OF DETROIT, MICHIGAN, A CORPORATION OF MICHIGAN.

WIREWORKING MACHINE.

Application filed January 2, 1924. Serial No. 683,954.

This invention relates to a wire working machine, and has special reference to that class of machines by which pieces of wire may be bent, twisted or otherwise formed to produce a garment hanger having a trousers support or hanger body, coat arms, and a hook by which the hanger may be suspended from a suitable support.

Our invention, in its broadest aspect, involves the formation of a garment hanger from a single piece of wire malleable enough to be expeditiously and economically formed into a garment hanger by a machine wherein the wire blanks are automatically operated upon and the complete hangers ejected therefrom. The wire after having a hanger configuration imparted thereto possesses sufficient rigidity to retain such configuration for all practical purposes, and the matter of manipulating the wire is such as to preclude cracking or breaking of any part of the wire during the formation of a hanger.

Our invention further aims to provide a machine wherein garment hangers are formed in an upright position, in contradistinction to any other type of wire working machine or device by which garment hangers may have been formed in a horizontal position, the distinction being advantageous from the standpoint of automatically feeding wire blanks to the machine and having complete hangers ejected therefrom in such positions as to be easily counted and handled.

Our invention further aims to provide a wire working machine which includes a compact organization of wire bending and twisting instrumentalities, all of which are arranged to be operated in timed relation from a driven shaft and the co-operation of these instrumentalities is such that during one revolution of the shaft or during a cycle of the machine a complete garment hanger is produced. With the wire blanks automatically fed to the machine and hangers ejected therefrom, it is obvious that there may be a maximum production for machines of this type.

Our wire working machine includes a body or framework power transmission mechanism and a control therefor; a wire blank magazine and feeding mechanism; blank holders, shoulder forming dies and die operating mechanism, shank forming instrumentalities and the actuating mechanism thereof; an anvil and clamp with clamp operating mechanism; shank twisting chuck and its operating mechanism; hook forming instrumentalities; and, ejecting mechanism and a hanger holder. These various organizations will be hereinafter described in detail under separate captions, and reference will now be had to the drawings, wherein Figure 1 is a front elevation of the machine, without the feeding mechanism and partly broken away and partly in section;

Fig. 3 is a vertical cross sectional view taken on the line III—III of Fig. 2;

Fig. 4 is a vertical cross sectional view illustrating a detail of a hook forming mechanism;

Fig. 5 is a plan of the greater part of the machine partly in horizontal section;

Fig. 11 is an enlarged vertical longitudinal sectional view taken on the line XI—XI of Fig. 1, illustrating a blank carrier forming part of the feeding mechanism;

Fig. 12 is an enlarged horizontal sectional view of a device associated with the shank twisting mechanism;

Fig. 13 is a horizontal sectional view taken on the line XIII—XIII of Fig. 1;

Fig. 14 is an enlarged horizontal sectional view taken on the line XIV—XIV of Fig. 1, illustrating the hook forming instrumentality;

Fig. 15 is an enlarged vertical sectional view taken on the line XV—XV of Fig. 1, illustrating the ejecting mechanism and the hanger holder;

Fig. 16 is a front elevation of the anvil of the machine;

Fig. 17 is a front elevation of the complete garment hanger;

Fig. 18 is an enlarged vertical sectional view of the wire twisting chuck;

Fig. 19 is a bottom plan of the same;

Fig. 20 is a side elevation of the wire twisting chuck relative to the anvil of the machine and illustrating a portion of the garment hanger in connection therewith;

Fig. 21 is a perspective view of one of the shank forming instrumentalities;

Fig. 22 is a vertical longitudinal sectional view of the same taken on the line XXII—XXII of Fig. 1;

Fig. 23 is a perspective view of a detached blank holder;

Fig. 24 is a plan of a portion of the machine;

Figure 40:
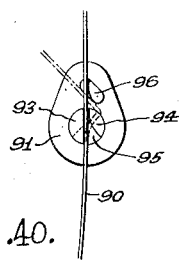
Figure 41:
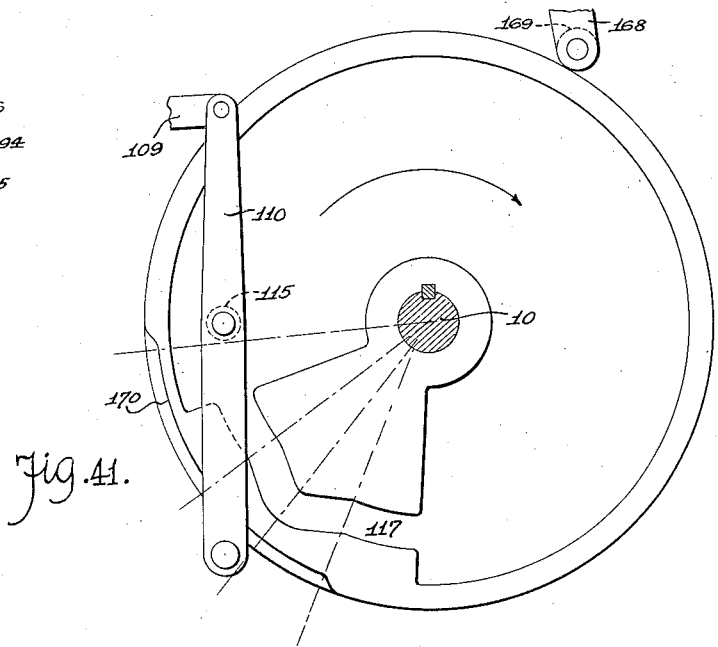
Figure 42:
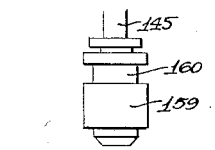
Figure 43:
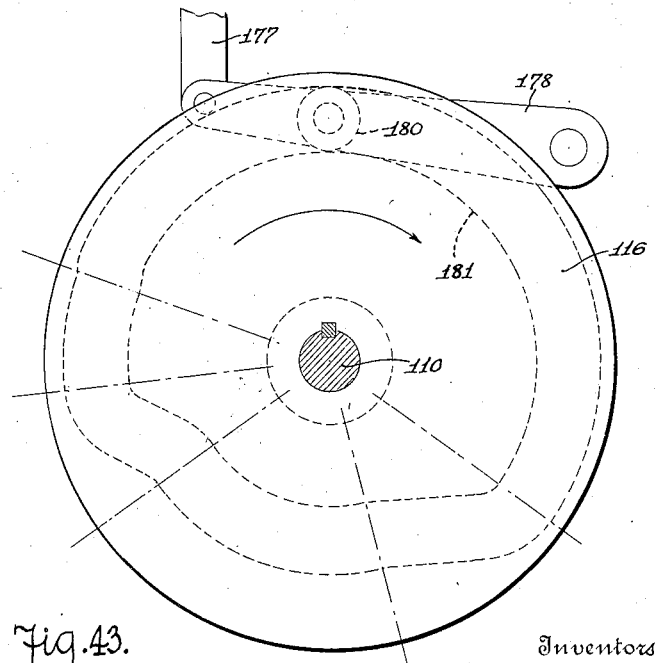

Figs. 25 to 30 inclusive diagrammatically illustrate different operations performed in the machine from a wire blank to a complete garment hanger;

Fig. 31 is a front elevation, somewhat diagrammatic, of the shoulder forming dies illustrating the operation of the dies for producing the embryo hanger shown in Fig. 26;

Fig. 32 is a similar view showing the operation of the shank forming instrumentalities for producing the embryo hanger shown in Fig. 27, also the operation of the shank twisting chuck for producing the partially formed hanger shown in Fig. 29;

Fig. 33 is a similar view showing the manner in which the partially formed hanger is held during the operation of the hook forming instrumentalities for producing the complete hanger shown in Fig. 20;

Fig. 34 is a perspective view of one of the shoulder forming dies;

Fig. 35 is a cross sectional view taken on the line XXXV—XXXV of Fig. 34;

Fig. 36 is a front elevation, somewhat diagrammatic, illustrating the shoulder forming die relative to a portion of a wire blank;

Fig. 37 is an elevation of the shoulder forming die cam;

Fig. 38 is a front elevation, somewhat diagrammatic, of a hook forming instrumentality relative to a portion of a hanger shank;

Fig. 39 is a detail sectional view of the cam which controls the hook forming instrumentality;

Fig. 40 is a front elevation of one of the shank forming instrumentalities relative to a portion of a blank;

Fig. 41 is an elevation of the cam which controls the shank forming instrumentality;

Fig. 42 is a front elevation of the anvil, a portion of the shank twisting chuck and a hanger shank, and Fig. 43 is an elevation of the cam which controls the operation of the shank twisting chuck relative to the hanger shank.

*Machine body power transmission and its control.* (*Figs. 1, 2, 3, 5, 6 and 7.*)

The body or framework of the machine comprises end supports or legs 1 and 2 connected by a machine bed or platform 3 and mounted on the ends of this machine bed are vertical front and rear frames 4 and 5 respectively, which are connected by longitudinally disposed trusses 6 and 7 located at the upper ends of said frames. The front and rear frames 5 and 6 have the confronting faces thereof provided with longitudinally alining bearings 8 and 9 for a cam shaft 10 and mounted on the rear end of the cam shaft is a large gear wheel 11 meshing with a small gear wheel 12 journaled on a stub shaft 13 supported from the rear frame 5 of the machine. Integral with the small gear wheel 12 is a large gear wheel 14 meshing with a small gear wheel 15 loose on a stub shaft 16 supported from the rear support 2 of the machine. The small gear wheel 15 has a clutch member 17 and adapted to mesh therewith is a clutch member 18 of another gear wheel 19 slidable on the shaft 16. The clutch member 18 may be shifted into and out of engagement with the clutch member 17 by a shift rod 20 extending through the supports 1 and 2 of the machine to the front side of the machine where the operator or attendant can readily control the operation of the machine.

The gear wheel 19 may be driven by an electric motor or from any suitable source of power, and the gearing to the cam shaft 10 has been simply illustrated as a conventional means of applying power to the cam shaft 10.

*Blank magazine and feeding mechanism.* (*Figs. 1, 5, 8, 9, 10 and 11.*)

Figure 8:
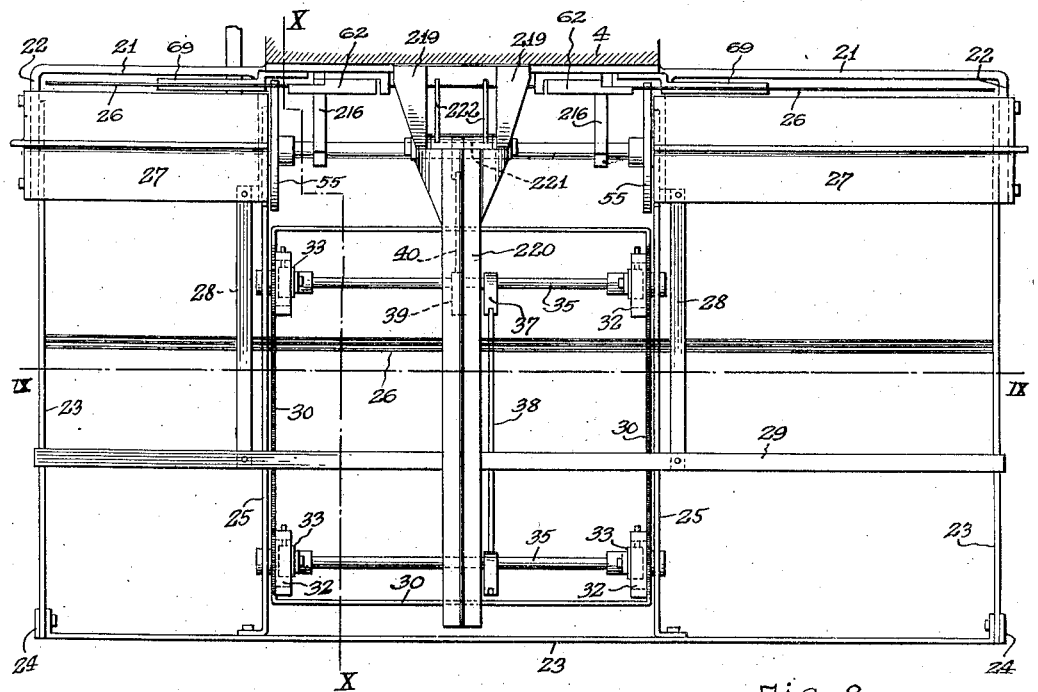
Fig. 8 is a plan of the wire blank feeding mechanism of the machine.
Figure 9:
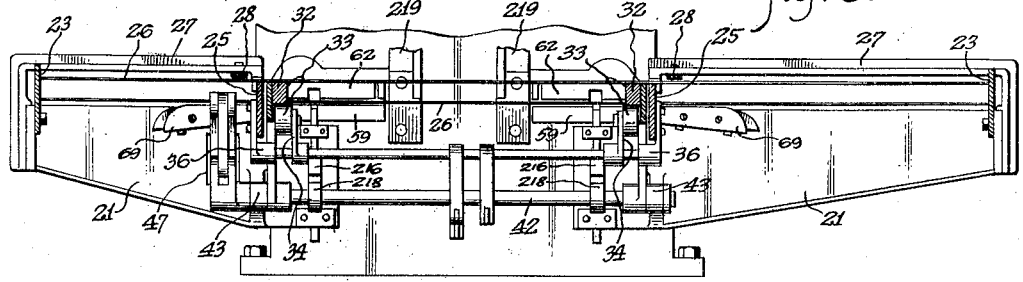
Fig. 9 is a cross sectional view of the same taken on the line IX—IX of Fig. 8.
Figure 10:
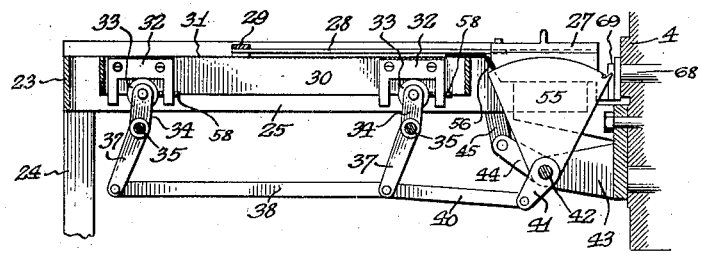
Fig. 10 is a longitudinal sectional view of the same taken on the line X—X of Fig. 8.

Suitably attached to the front face of the front frame 4 are laterally extending side brackets 21 having angular ends 22 to which are attached the ends of a horizontally disposed frame 23 projecting forwardly from the machine and supported by legs 24. Mounted in the frame 23 are parallel longitudinally disposed rails 25 having the outer ends thereof attached to the frame and the inner ends attached to the brackets 21. The upper edges of the rails 25 are in a horizontal plane below the plane of the upper edges of the frame 23 so that the sides of the frame 23 may serve as end abutments for wire blanks 26 placed in the frame on the rails 25, as best shown in Figs. 8 and 9.

Mounted on the inner ends of the rails 25 and the angular ends 22 of the brackets 21 are connecting members 27 to which are attached the inner ends of longitudinally disposed guide bars 28, said bars having the outer ends thereof supported by a cross bar 29 supported from the sides of the frame 23, said bars cooperating in forming a retaining frame or member in a plane above the rails 25 to prevent vertical displacement of the wire blanks 26 placed on said rails.

Between the rails 25 is a blank feeding member 30 in the form of a rectangular frame which has its upper side edges notched or roughened, as at 31 so as to frictionally engage the wire blanks 26 and shift said blanks inward towards the front frame 4 of the machine. The blank feeding member 30 has its inner side walls provided with recessed bearings 32 for anti-frictional rollers 33 supported from the cranks 34 of rock shafts 35, said rock shafts being journaled in depending bearings 36 carried by the outer sides of the rails 25. The rock shafts 35 have other cranks 37 connected by a link 38 and when the link 38 is reciprocated, the blank feeding member 30 is raised and moved forward to carry with it such wire blanks that may be resting upon the rails 25 in the path of the blank feeding member. After shifting wire blanks towards the front frame 4 of the machine the blank feeding member 30 will be retracted to again perform such operation.

The shaft 35, adjacent the inner end of the frame 23, has an additional crank 39 and this crank is connected by a link 40 to the crank 41 of a rock shaft 42, journaled in bearings 43, carried by the brackets 21. On one end of the shaft 42 is a crank 44 connected by a link 45 to a long crank arm 46 extending through an opening 47 provided therefor in one of the brackets 21. (See Fig. 3.) The long crank arm 46 is mounted on the end of a rock shaft 48 journaled in a bearing 49, carried by a bracket 50 projecting rearwardly from the inner face of the front frame 4 of the machine, as best shown in Fig. 5, and mounted on the rock shaft 48 is another crank 51 provided with an anti-frictional roller 52. This roller is adapted to engage the cam face 53 of a small cam drum 54 keyed or otherwise fixed on the cam shaft 10. The cam face 53 of the small cam drum is adapted to rock the shaft 48 once during each revolution of the cam shaft 10 and in consequence of this actuation the blank feeding device or member 30 will be intermittently actuated to advance the wire blanks 26 towards the machine proper.

Again considering the rock shaft 42 at the front end of the machine, sector shaped blank carriers 55 are mounted on said shaft. These blank carriers are at the inner sides of the rails 25 and said rails are cut away, as at 56 to permit the wire blanks 26 to descend on to the upper curved edges of the blank carriers, as best shown in Fig. 11. The inner ends of the connecting members 27 are shaped to cooperate with the blank carriers in guiding a wire blank from the rails 25 to a position at the front end of the machine where the wire blank may be operated upon. For shifting one wire blank at a time the upper edges of the blank carriers 55 are provided with pockets 57 adapted to receive a wire blank at the front edges of the members 27 and transfer the wire blank to a position at the rear edges of the members 27, where one of the wire blanks is shown in Fig. 8.

Provision may be made for various adjustments in connection with the blank magazine and feeding mechanism, for instance, the recessed bearings 32 may be provided with adjustable screws or stops 58 to limit the movement of the cranks 34 in the recesses of said bearings.

*Blank holders and shoulder forming dies with the die operating mechanism. (Figs. 1, 3, 5, 6, 15, 23, and 31 to 37 inclusive.)*

Secured to the front face of the frame 4 are transversely alining blank holders 59 each having a longitudinal shoulder 60 to receive the blank and each holder is recessed, as at 61 for a longitudinally disposed shoulder forming die 62, which has a tongue and groove connection 63 with the body of the holder and is adjustably held by screws 64 or other fastening means. The outer end of each die has a head 65 presenting a curved or convexed surface against which the end of a wire blank may be bent, and each die and its holder are slotted or notched, as at 66, to provide clearance for ejectors to be hereinafter considered.

The blank carriers 55 are adapted to place one of the wire blanks 26 in the blank holders with the ends of the wire blank projecting outwardly over the brackets 21.

The front frame 4, adjacent the outer ends of the holders 59, are provided with bearings 67 for rock shafts 68 and on the forward ends of said rock shafts are shoulder bending dies 69, each in the form of a channel crank in which is mounted an adjustable insert 70 cooperating with the walls of the crank in providing a groove 71 to receive the end of the wire blank. The inserts 70 may be adjusted by side screws 72 and bottom screws 73.

Mounted on the inner ends of the rock shafts 68 are pinions 74 meshing with racks 75 adjustably mounted in the side edges of a V shaped reciprocable member 76 located adjacent the inner face of the frame 4 and best shown in Figs. 3 and 5. The lower end of the reciprocable member 76 has a vertical tongue portion 77 slidable between guides 78 carried by the frame 4 and the upper ends or side edges of the reciprocable member 76 are slidable in guide brackets 79 secured to the side edges of the frame 4.

Slidable in the lower portion of the reciprocable member 76 is a head 80 and pivotally connected to said head by a pin 81 is a crank 84 carried by a shaft 83 having its ends journaled in bearings 84 carried by the confronting faces of the frames 4 and 5. Associated with the crank 82 is another crank 85 provided with an anti-frictional roller 86 extending into a cam groove 87 provided therefor in the face of a large cam drum 88 mounted on the cam shaft 10 and keyed or otherwise fixed to the periphery of the small cam drum 54, as at 89. The cam groove 87 has a contour which causes the shoulder bending dies 69 to be swung in synchronism to approximately a vertical position, as shown in Fig. 31, thus bending the ends of the wire blank so that it has substantially the configuration shown in Fig. 26. After such bending operation there is a period of rest and eventually the cam groove 87 causes the shoulder bending dies to be swung inwardly towards each other and the central vertical plane of the machine, as shown in Fig. 32, but before this action takes place the upper ends of the coat arms 90 of the blank 26 are operated upon as will appear under the following caption.

*Shank forming instrumentalities and the actuating mechanism thereof. Figs. 1, 13, 21, 22, 31, 32, 40 and 41.)*

The frame 4, adjacent the side edges and approximately midway of its upper and lower ends, is provided with bearings 91 for reciprocable rock shafts 92 and the outer ends of said rock shafts are cut away and slotted to provide opposed bending lugs 93 and 94 with an arm receiving slot 95 between said lugs. The lugs 94 are of greater length than the lugs 93 so as to protrude into a plane in front of the lugs 93, and it is in this connection that the lugs 94 serve as stops or abutments against which the arms 90 are swung by the shoulder forming dies 69. Cooperating with the stop lugs 94 are abutments 96 carried by the forward ends of rods 97 slidable in the bearings 91 with the rear ends thereof slotted, as at 98 to receive collars 99 of the rock shafts 92. The bearings 91 are recessed, as at 100 to receive the abutments 96 and since the rods 97 are reciprocable in synchronism with the rock shafts 92, the abutments 96 and the lugs 93 and 94 may be retracted into the bearings 91, when it is necessary to swing the upper ends of the arms 90 past the bearings 91, as will hereinafter appear. Before this takes place the upper ends of the arms 90 are bent for the formation of a shank, and it might be well to note at this time that one of the arms 90 has an extremity 101, as shown in Figs. 26 to 29 inclusive, such extremity eventually resulting in a hook, as shown in Fig. 30.

Considering the means for rocking the shafts 92, said shafts have cranks 102 connected by a link 103 and one of said cranks is connected by a link 104 to the crank 105 of a rock shaft 106, said rock shaft extending longitudinally at the side of the machine with its ends journaled in bearings 107 carried by the frames 4 and 5 of the machine.

On the shaft 106, contiguous to the rear end thereof, is a crank 108 connected by a link 109 to the upper end of an arm 110 which has its lower end pivotally mounted in a bearing 111 on the bed 3 of the machine, said bearing having a shoulder or stop 112 to limit the swinging movement of the arm 110 in one direction. The upper end of the arm 110 is connected by a coiled retractile spring 113 to a bracket 114, at the opposite side of the machine, projecting forwardly from the rear frame 5. The retractile force of this spring retains the arm 110 normally against the stop 112 but permits of said arm being swung and this is accomplished by an anti-frictional roller 115 of said arm extending into the front face of another large cam drum 116 mounted on the cam shaft 10.

The front face of the large cam drum 116 has a cam groove 117 which engages the roller 115, oscillates the arm 110, rocks the shaft 106 and causes the shafts 92 to be rocked in synchronism.

Considering the means for distending and retracting the rock shafts 92, said shafts have the rear ends thereof provided with collars or spools 118 and loosely engaging said collars are fork members 119 having shanks 120 journaled in cranks 121 of a rock shaft 122 supported by bearings 123 from the side edges of the front frame 4.

One of the cranks 121 is pivotally connected to a rearwardly extending shift member 124 extending in close proximity to the periphery of the large cam drum 88 and the rear end of said shift member is bifurcated and slidably supported in a bracket 125 extending forwardly from the front frame 5 of the machine. Adjacent the ends of the shift member 124 are anti-frictional rollers 126 and 127 and these anti-frictional rollers are adapted to normally engage the front and rear faces of the large cam drum 88, said front and rear faces having cam surfaces 128 and 129 for the rollers 126 and 127 respectively, so that when the large cam drum is revolved the member 124 will be reciprocated, rock the shaft 122 and cause the rock shafts 92 to be reciprocated.

The bearings 91 are provided with guides 130 and mounted on the front frame 4 are guides 131 which will cooperate with the guides 130 in directing the arms 90 into position to be operated upon by the shank forming instrumentalities. As the arms 90 are raised for vertical position by the shoulder forming dies 69 said arms impinge against the lugs 94 and the abutments 96. The rock shafts 92 are further distended to place the arms 90 in the slots 95 between the lugs 93 and 94 and then the shafts 92 are rocked causing the lugs 93 and 94 to kink or bend the arms 90 while the ends thereof bear against the abutments 96. This is best brought out in Fig. 32 and upon such being accomplished the shafts 92 and the rods 97 are retracted thus placing the lugs 93 and 94 and the abutment 96 within each bearing 91 leaving the face of the bearing clear in order that each of the arms 90 may be swung inwardly. As before intimated, this is accomplished by further rocking movement of the shafts 68 and the angular ends of the arms 90 are brought approximately together, as shown in Fig. 42.

*Anvil and clamp with the clamp operating mechanism.* (Figs. 1, 2, 16, 20 and 42.)

The front frame 4 of the machine has an oblong opening 132 and fixed to the front wall, below said opening, is an anvil 133 having a ledge 134 on which the angular ends of the arms 90 are placed with the ends substantially in parallelism and the extremity 101 extending in a vertical direction. Holding the ends of the arms on the anvil is a pivoted clamping member 135 supported by a bracket 136 attached to the front face of the frame 4. The upper end of the clamping member 135 has a clamping jaw 137 at the anvil 133 and the lower end of the clamping member is loosely connected to the reduced end of a plunger 138 slidable in the frame 4 and the bearing 139 attached to the inner face of the frame 4. The rear end of the plunger 138 has an anti-frictional roller 140 engaging the front face of the small cam drum 54, which front face has a cam 141 adapted to distend the plunger 138, rock the clamping member 135, and place the jaw 137 against the arms 90 on the ledge 134 of the anvil 133.

The lower end of the clamping member 135 is connected by a coiled retractile spring 142 to the bearing 139, so that the jaw 137 may be held in an open position to permit of the ends of the arms 90 being swung on to the anvil.

The reduced end of the plunger 138 may be in the form of an adjustable screw carried by the lower end of the clamping member 135 with the screw held normally against the end of the plunger 138 by the retractile force of the spring 142.

*Shank twisting chuck and its operating mechanism.* (Figs. 1, 2, 18, 19, 20, 24, 32, 42 and 43.)

On the front face of the frame 4, above the opening 132, are vertical parallel guides 143 and slidable between said guides is a head 144 carrying a vertically disposed chuck spindle 145 which extends through the gear housing 146 attached to the frame 4 above the guides 143. In the gear housing 146 is a pinion 147 slidable on the spindle 145 but keyed thereto for rotating said spindle. Meshing with the pinion 147 is a sector gear or rack 148, best shown in Figs. 2 and 24, said sector gear being mounted on the upper end of a vertically disposed rock shaft 149, journaled in bearings 150, carried by the truss 6 connecting the frames 4 and 5. On the lower end of the shaft 149 is a crank 151 provided with an anti-frictional roller 152 engaging in a cam groove 153 provided therefor in the periphery of the large cam drum 88, so that when said drum is revolved the sector gear 148 will be swung to impart rotation to the chuck spindle 145.

Figure 7:
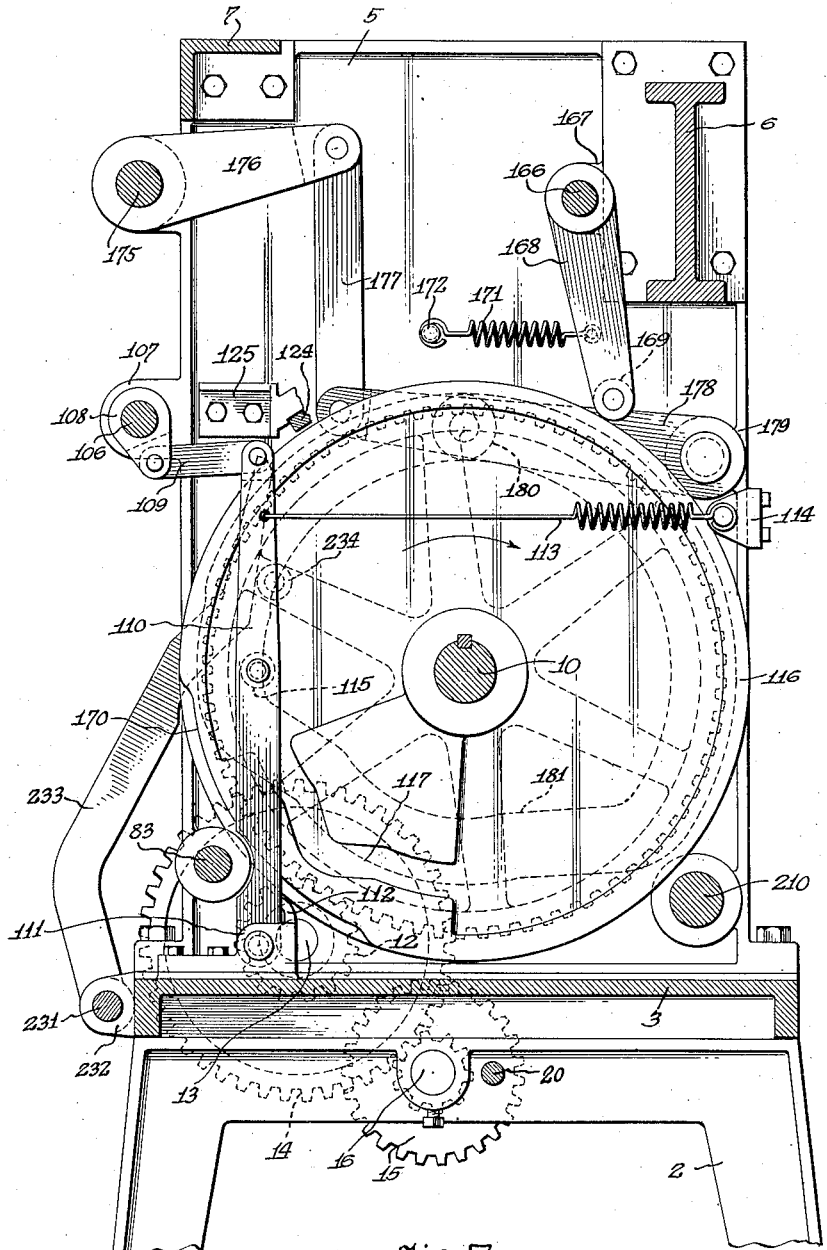
Fig. 7 is a similar view taken on the line VII—VII of Fig. 5.

On the lower end of the chuck spindle 145 is a bifurcated cylindrical head 154 and pivoted in the bifurcation 155 of said head are opposed chuck jaws 156 having beveled outer edges 157 and grooved gripping faces 158, the latter adapted to engage the upstanding ends of the arms 90 and grip such ends when the jaws 156 are closed. For closing the jaws 156 a sleeve 159 is slidably mounted on the head 154 and adapted to be lowered against the outer beveled edges 157 of the chuck jaws 156 to close and clamp said jaws on the upstanding ends of the coat arms 90. The sleeve 159 has a circumferential groove 160 and extending into said groove is an anti-frictional roller 161 carried by a bell crank 162 pivotally connected to a bracket 163, carried by the head 144. The opposite end of the bell crank 162 has another anti-frictional roller extending into a tiltable guideway 164 housed within a recess 165 of the front frame 4 and supported by the forward end of a rock shaft 166 journaled in bearings 167, carried by the frames 4 and 5 of the machine. Mounted on the shaft 166 is a crank 168 having an anti-frictional roller 169 normally bearing on the periphery of the large cam drum 116 and adapted to engage the cam surface 170 of said drum, as best shown in Fig. 7. The crank 168 is normally held in engagement with the drum 116 by the retractile force of a spring 171 connected with said crank and a pin 172 extending forwardly from the frame 5. Once during each revolution of the large cam drum 116 the shaft 166 will be rocked and the guideway 164 tilted to actuate the bell crank 162, at a predetermined time, and cause the sleeve 159 to close the chuck jaws 156.

The above operation takes place after the chuck has been lowered over the upstanding ends of the arms 90; the chuck spindle 145 being tubular or hollow to receive the upstanding ends of the arms. The raising and lowering of the chuck is accomplished by the following mechanism. A link 173 is connected to the slide head 144 and connected to said link is a crank 174 on the forward end of the shaft 175 journaled in bearings carried by the frames 4 and 5 of the machine. On the rear end of the shaft 175 is another crank 176 connected by a link 177 to an arm 178 pivotally connected to a bearing 179 on the rear frame 5 of the machine. The side of the arm 178 has an anti-frictional roller 180 extending into a cam groove 181 in the rear face of the large cam drum 116 (see Fig. 43).

Thus far means has been disclosed for bodily raising and lowering the chuck and for closing the chuck jaws 156 on the upstanding ends of the arms 90 clamped on the anvil 133 of the machine. Means has also been disclosed by which the chuck spindle is revolved and in consequence of such rotation the upstanding ends of the arms 90 are twisted for three or more turns, as best shown in Fig. 20, where it will be noted that the hollow chuck spindle 145 provides clearance for the extremity 101 of one of said coat arms.

Figure 1:
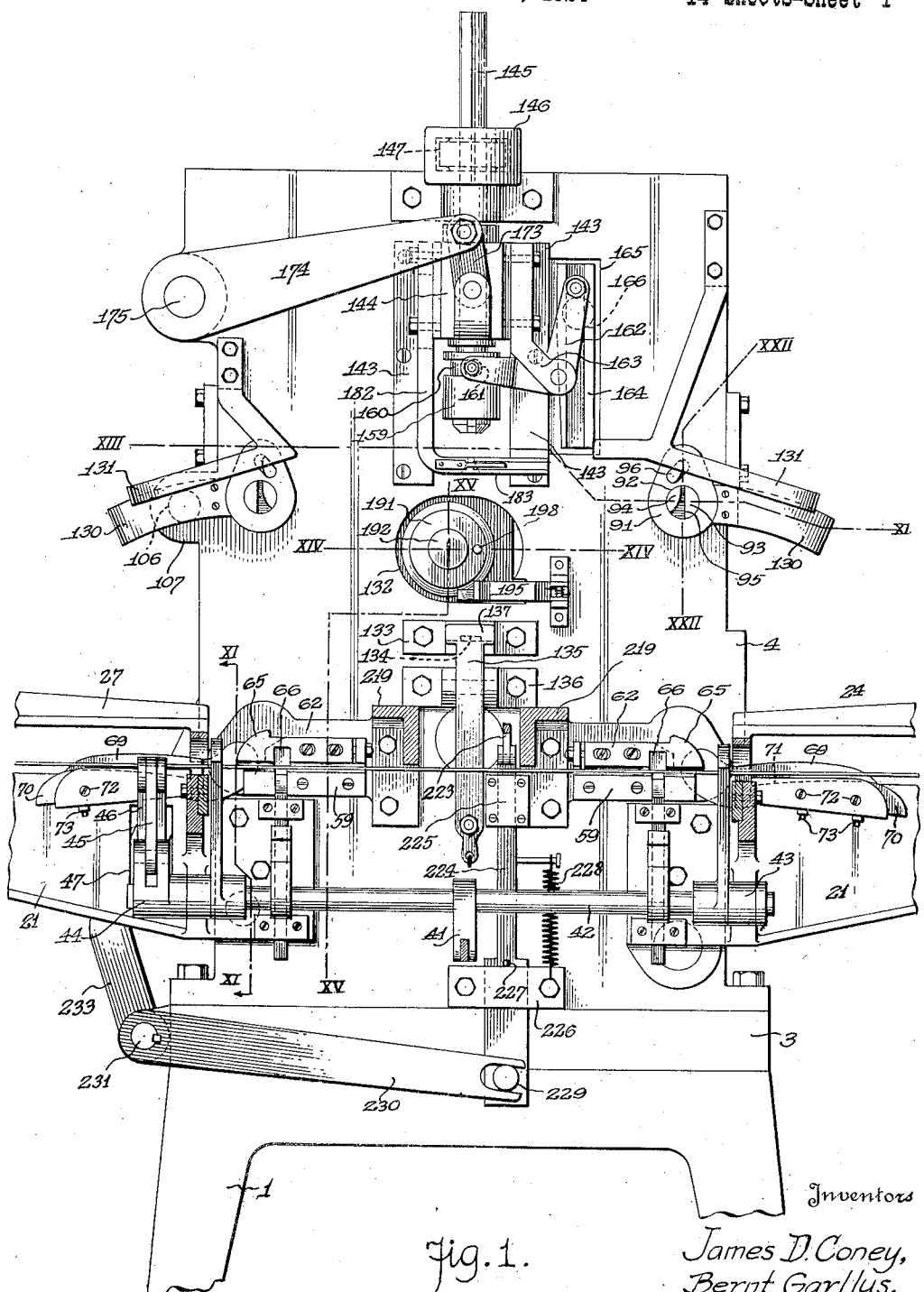
Figure 2:
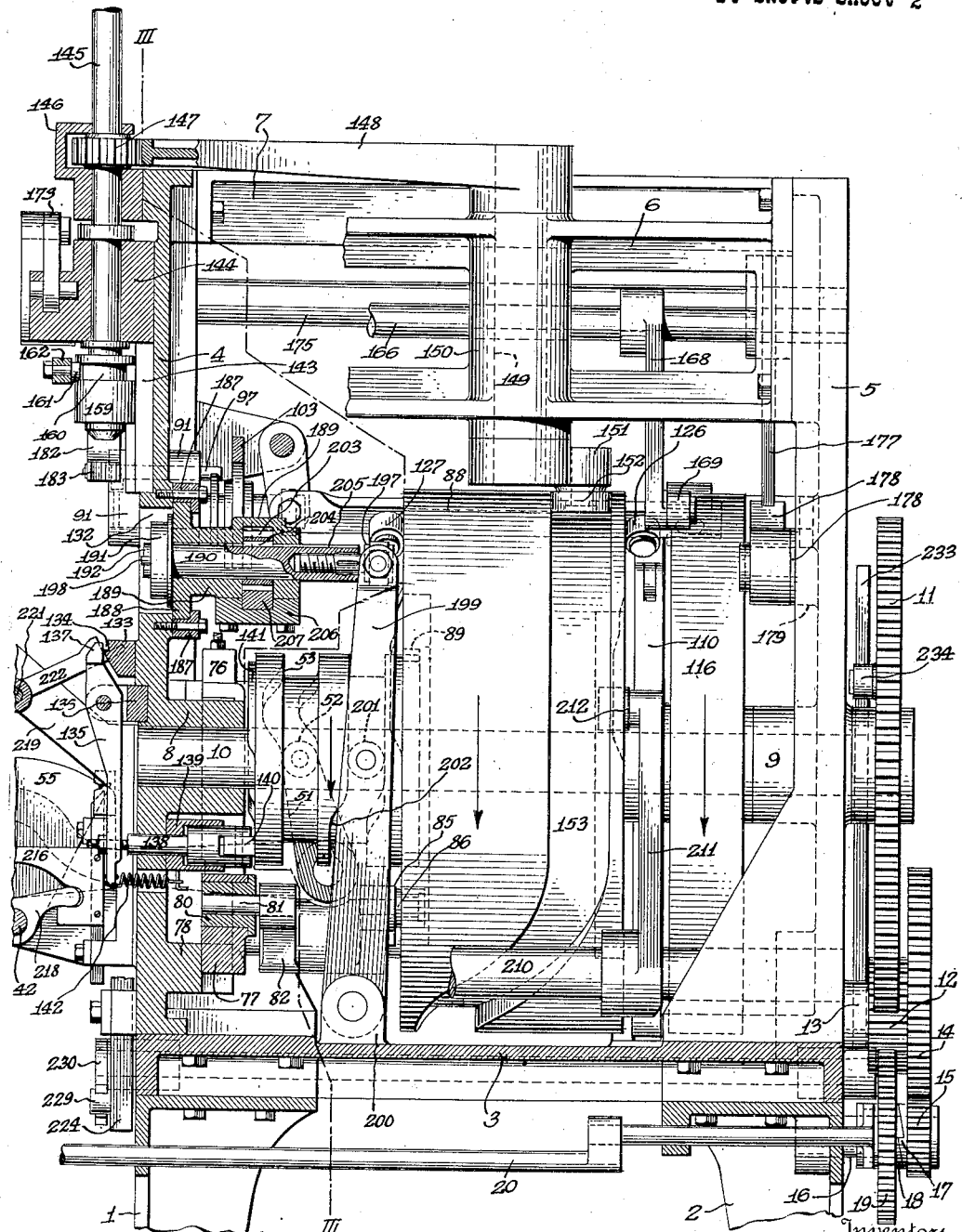
Fig. 2 is a side elevation of the machine, partly broken away and partly in longitudinal section.
Figure 6:
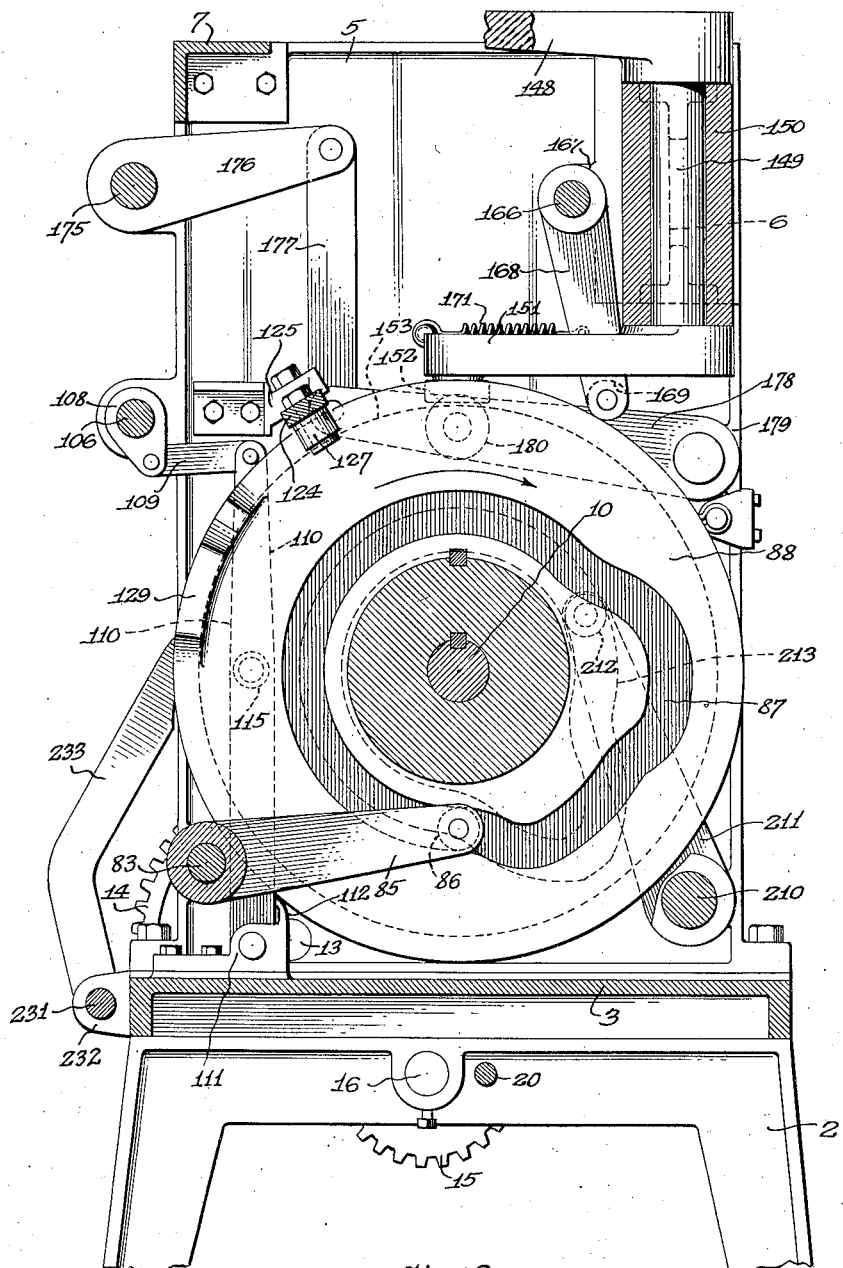
Fig. 6 is a vertical cross sectional view taken on the line VI—VI of Fig. 5.

In order to brace the upper ends of the coat arms 90 while being twisted together and also prevent vibration of the upper ends of the arms and thus permit of the chuck being readily lowered into position, the slide head 144 is provided with an adjustable bracket 182 having a horizontal bifurcated and apertured arm 183, said arm being longitudinally slotted, as at 184 so that the extremity 101 of one of the coat arms 90 may enter a vertical aperture 185 which receives both arms when the slide head 144 is lowered, otherwise the arm 183 provides clearance for the short end of one of said arms, but receives the extremity 101 of the other arm as said arm is swung inwardly from the right hand side of the machine, viewing Fig. 1. In order that the extremity 101 may be retained in the aperture 185 while the arm 183 is lowered, the front side of the arm 183 is provided with a spring pressed latch 186 by which the extremity 101 passes into the aperture 185 and is retained in said aperture by the latch snapping to a closed position, as best shown in Fig. 12.

*Hook forming instrumentalities.* (*Figs. 1, 2, 3, 4, 5, 12, 13, 14, 33, 38, and 39.*)

The front frame 4, at the rear end of the opening 132 is provided with horizontal guides 187 for a slide head 188 having a bearing 189 for a rotatable and reciprocable shaft 190. On the forward end of the shaft 190 and normally housed within the opening 132 of the frame 4 is a hook forming head 191 provided with a central boss 192 and a pin 193 adjacent said boss.

Contiguous to one end of the opening 132 is a bracket 194 and pivotally mounted on said brackets is a spring pressed anvil or abutment 195 which normally extends into the opening 132 against a peripheral flange 196 of the head 191. This pivoted anvil or abutment is adapted to be swung out of the opening 132 when the shaft 190 is reciprocated to shift the head 191 into an active position, and when this is accomplished the extremity 101 of the coat arm will extend between the boss 192 and the pin 193, with the twisted portion of the hanger shank braced by the pivoted anvil 195 (see Fig. 33). To accomplish an outward movement of the head 191 the rear end of the shaft 190 is provided with an adjustable spool 197 and engaging said spool is a fork 198 pivotally supported by the upper end of an arm 199 which has its lower end pivotally supported by a bearing 200 on the bed 3 of the machine. The arm 199 is adjacent the small cam drum 54 and said arm has an anti-frictional roller 201 extending into a peripheral cam groove 202 of the small cam drum 54 (see Fig. 2). Rotation of the small cam drum 54 will cause the arm 199 to be oscillated and the shaft 190 reciprocated, said shaft being extended to place the hook forming head in engagement with the extremity 101 of the hanger shank.

The above having taken place it is now necessary to bodily shift the slide head 188 to bend the extremity 101 preparatory to forming a hook, the extremity being bent against the anvil or abutment 195 which remains stationary during the movement of the slide head 188. The bend in the extremity 101 is best shown in Fig. 33 and after such bend is made the head 191 is partially rotated in a counterclockwise direction so that the pin 193 will cause the extremity 101 to be wrapped around the central boss 192, until a hook is formed. The shifting of the slide head 188 and rotation of the hook forming head 191 are accomplished by the following mechanism.

The rear end of the bearing 189 affords a housing for a pinion 203 provided with a key or spline 204 slidable in a keyway 205 longitudinally of the shaft 190, such pinion connection permitting of the shaft 190 being reciprocated as previously pointed out. Secured to the bearing 189 and forming part of the pinion housing is a guideway 206 for a rack 207 meshing with the pinion 204, and one end of said rack is pivotally connected by a link 208 to the upper end of a crank 209 mounted on a shaft 210, journaled in the frames 4 and 5 of the machine in proximity to the bed 3 thereof. On the shaft 210 is an upwardly extending crank 211 provided with an anti-frictional roller 212. Extending into a cam groove 213 is the rear face of the large cam drum 88, best shown in Figs. 2 and 39. When the large cam drum 88 is revolved the shaft 210 will be rocked and the rack 207 pulled upon causing the head 188 to be bodily moved to produce the bend in the extremity 101 preparatory to the formation of the hook, but as the rack 207 is pulled upon and the head 188 shifted the rack rotates the pinion 203 imparting partial rotation to the shaft 190 which causes the extremity 101 to be wrapped over the upper portion of the central boss 192.

It is to be noted that the fork 198 employed for reciprocating the shaft 190 does not interfere with movement of the shaft while being carried in a lateral direction by the slide head 188. Furthermore, that the pivoted anvil 195 is behind the shank and when the head 191 recedes into the opening 132 the free end of the anvil may move with said head, as shown by dot and dash lines in Fig. 14, thus liberating the upper portion of the shank and the hook.

*Ejecting mechanism and hanger holder. (Figs. 1, 2, 5, 7, 9 and 15.)*

When describing the blank holders and shoulder forming dies, I stated that the holders and dies have notches or slots 66. Slidable in these notches or slots are the upper beveled ends 213 of vertically disposed ejectors 214, said ejectors also sliding in guides 215 mounted on the inner ends of the brackets 21. Attached to the ejectors 214 are forwardly extending lift members 216 having undercut cam surfaces 217 normally engaged by cranks 218 mounted on the rock shaft 42 and when this shaft is rocked to swing the blank carriers 55 back to pick up a wire blank from the blank feeding device 30 the ejectors 214 are raised causing the beveled ends 213 of said ejectors to force the body or horizontal portion of the garment hanger out of the holders 59 and the dies 62.

Suitably attached to the front face of the frame 4 and extending forwardly above the blank magazine and feeding mechanism are the arms 219 of a holder 220. The arms 219 are in proximity to the anvil 133 and journaled in said arms is a rock shaft 221 provided with transfer arms 222 adapted to engage under the arms 90 of the garment hanger, adjacent the shank thereof, and bodily lift the garment hanger off of the anvil and on to the holder 220. This takes place after the clamping member 135 has released the garment hanger on the ledge 134 of the anvil.

One of the transfer arms 222 is connected by a link 223 to the upper end of a slide bar 224 slidable in guides 225 and 226 attached to the frame 4. The slide bar 224 has a stop pin 227 normally held against a guide 226 by the retractile force of a spring 228 connecting the slide bar 224 to the guide 226.

On the lower end of the slide bar 224 is an anti-frictional roller or stud 229 projecting into the bifurcated end of a crank 230, said crank being mounted on the forward end of a longitudinally disposed shaft 231, journaled in bearings 232, carried by the bed 3 of the machine. On the rear end of the shaft 231 is an upwardly and inwardly extending crank 233 and adapted to impinge against said crank is an anti-frictional roller 234 carried by one of the spokes of the large gear wheel 11 at the rear end of the machine.

It is believed that the operation of the machine will be understood, without a detail description of such operation, in view of the purpose and function of the machine elements having been set forth under the different captions. We now desire to mention one change that may be made in connection with the machine. The hook forming instrumentality may be arranged to form the hook on the extremity of the wire blank before the actual formation of the hanger shank, and instead of using a shank twisting chuck, electric welding may be employed. There are other changes that may be made, therefore we do not care to limit our invention other than defined by the appended claims.

What we claim is:—

1. In a wire working machine for forming a blank piece of wire into a garment hanger having coat arms, a shank and hook:—wire blank holders, swingable shoulder forming dies adapted to place the ends of the wire blank together, an anvil, a cam actuated clamping member adapted to cooperate with said anvil in temporarily holding the ends of said arms together, wire twisting means adapted to be lowered over the ends of said arms to twist said arms and form a shank, and hook forming means adapted to operate on the hanger shank while said hanger is held by said blank holders and said clamping means.

2. In a wire working machine wherein instrumentalities disposed in approximately a vertical plane are operated to bend a wire blank to form a shank having an extremity:—means for bending the shank extremity to form a hook, said means including a laterally shiftable head for initially bending the shank extremity, and a rotary head reciprocable relatively to said laterally shiftable head and adapted for further bending the shank extremity to form a hook.

3. In a wire working machine wherein a wire blank is bent to form a shank having an extremity:—means for bending the shank extremity to form a hook, said means including a laterally shiftable head for initially bending the shank extremity, a rotary head reciprocable in said shiftable head, and a rack and pinion adapted to cause lateral movement of said shiftable head and rotation of said rotary head.

4. A wire working machine as called for in claim 3, and cams adapted to cause reciprocation of said rotary head and actuation of said rack and pinion.

5. In a wire working machine wherein a wire blank is bent to form a shank having an extremity:—means for bending the shank extremity to form a hook, said means including a laterally shiftable head for initially bending the shank extremity, a hook forming head carried by said shiftable head, means adapted to reciprocate said hook forming head to place it in engagement with the shank extremity, and means adapted to rotate said head to bend the shank extremity into a hook, said head rotating means causing movement of said shiftable head.

6. A wire working machine as called for in claim 5, wherein said head rotating means includes a rack and pinion with said hook forming head slidable relative to said pinion.

7. In a wire working machine wherein instrumentalities are disposed in approximately a vertical plane for bending a wire blank to provide coat arms, reciprocable dies movable into and out of engagement with said arms for simultaneously bending the ends of said arms, means for reciprocating said dies, means for swinging the bent ends of said arms together, and means for twisting the bent ends of said arms to form a shank.

8. In a wire working machine wherein a wire blank is bent to form coat arms and said arms brought together to form a shank;—means for bending said arms preparatory to the formation of said shank, said means including reciprocable and rotary dies providing lugs and abutments, means for reciprocating said dies to place said lugs and abutments in engagement with said arms, and means for bodily moving said lugs relative to said abutments to bend said arms.

9. A wire working machine as called for in claim 8, and cam drums adapted for actuating both of said means in timed relation.

10. In a wire working machine wherein a wire blank is bent to form coat arms and said arms brought together to form a shank;—means for bending said arms preparatory to the formation of said shank, said means including reciprocable abutments, rotary and reciprocatory shafts having slotted ends to engage and bend said arms relative to said abutments, means connecting said abutments to said shafts for reciprocating said shafts, and means for rocking said rotary shafts.

11. A wire working machine as called for in claim 10, and cam drums adapted to cause said shafts to be reciprocated and rocked in synchronism, and the reciprocating movement timed relative to the rocking movement.

12. In a wire working machine wherein instrumentalities are disposed in approximately a vertical plane for bending a wire blank to form coat arms which are further bent preparatory to forming a shank and then the shank formed:—means for bending the ends of the blank upwardly substantially at a right angle to said blank to form arms, means adapted for bending the upper ends of said arms while retained substantially vertical, said first mentioned means being operatable to further bend said arms preparatory to the formation of a shank, and shank forming means.

13. In a wire working machine wherein a wire blank is bent to form a hanger, blank holding means, bending lugs, abutments adjacent said lugs, swingable shoulder forming dies below said bending lugs adapted by initial movement to place the ends of said wire blank in engagement with said bending lugs and abutments and by further movement form shoulders and place said blank ends together, means adapted to turn said bending lugs relative to said abutments to form angular blank extremities, and means adapted to retract said bending lugs and abutments to permit of said blank extremities being brought together by said shoulder forming dies.

14. A wire working machine comprising an upstanding frame in front of which a wire blank is converted into a vertically supported garment hanger by instrumentalities disposed in a vertical plane and including means on the front face of said frame for successively operating on the wire blank to form coat arms connected by a shank having a hook, and means at the rear face of said frame adapted for operating said means so that the operations are successively performed in timed relation, said last mentioned means including co-axially disposed cam drums in the central vertical plane of the machine.

15. Instrumentalities disposed in approximately a vertical plane and adapted to convert a wire blank into a complete garment hanger having coat arms, a shank, and a hook;—said instrumentalities including blank holders, means for intermittently placing blanks in said holders, means for bending the ends of said blanks while held by said holders to form the coat arms, means for connecting said coat arms to form the hanger shank, means for forming a hook out of said shank, and a series of cams by which all of said means are actuated in timed relation to one another, all of said means being disposed in a common vertical plane with said cams disposed at an angle to such plane.

16. In a wire working machine wherein a blank piece of wire is bent into a garment hanger having coat arms joined by a shank, and wherein the complete formation of the blank into a garment hanger is performed in a vertical plane means for bodily lifting the completed garment hanger from such vertical plane, said means comprising a holder projecting from the front of the machine, a pivoted transverse arm supported from said holder and adapted to engage in the garment hanger and lift the garment hanger on to said holder, and means adapted to actuate said transverse arm.

In testimony whereof we affix our signatures.

JAMES D. CONEY.
BERNT GARLLUS.